Feb. 22, 1966  R. W. BAILEY ETAL  3,236,036
CHAIN SAWS
Filed March 7, 1962  3 Sheets-Sheet 3

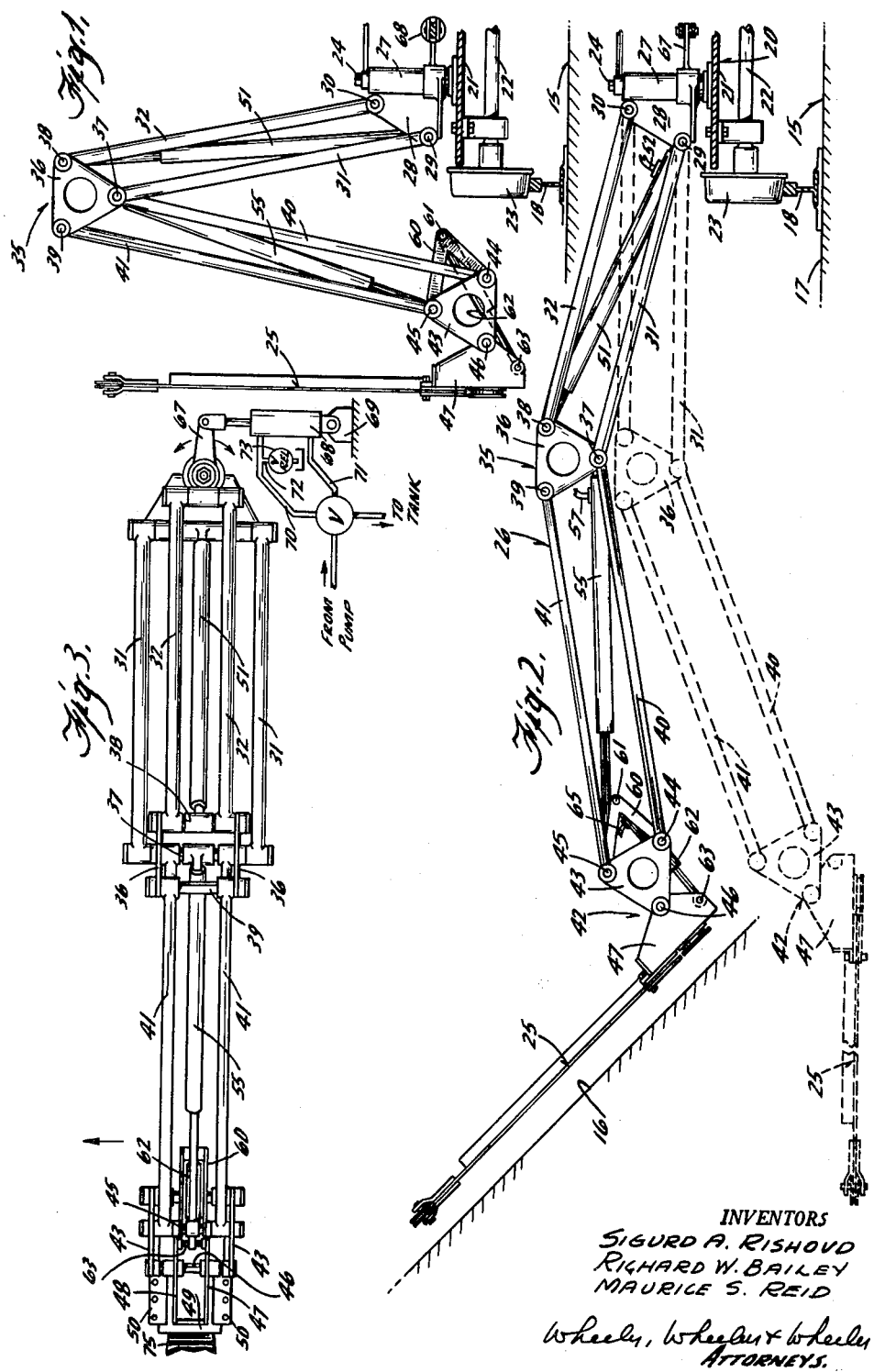

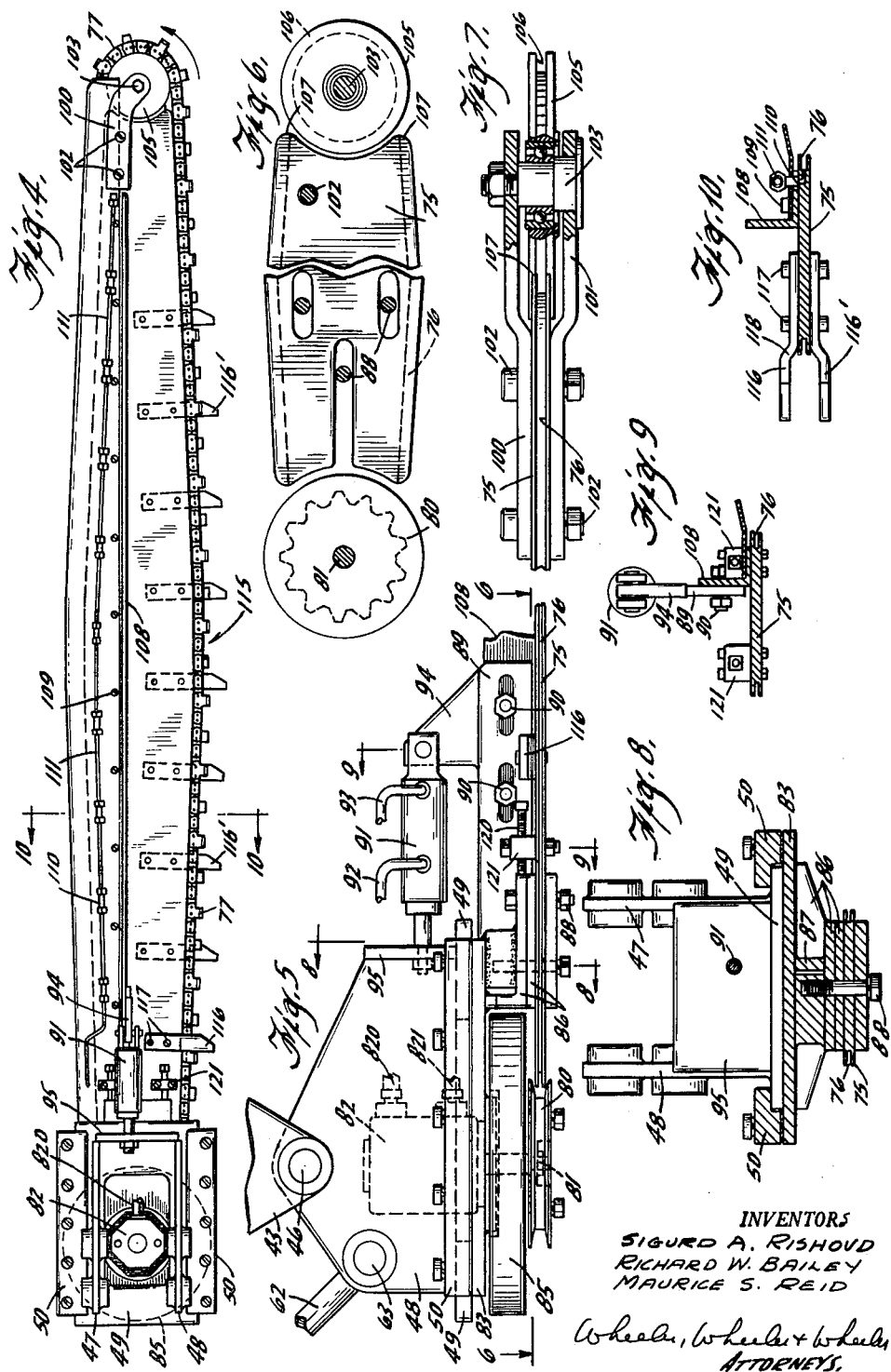

Fig. 11.

INVENTORS
SIGURD A. RISHOVD
RICHARD W. BAILEY
MAURICE S. REID

Wheeler, Wheeler & Wheeler
ATTORNEYS.

United States Patent Office 3,236,036
Patented Feb. 22, 1966

3,236,036
CHAIN SAWS
Richard W. Bailey, Oak Park, and Maurice S. Reid, Glen Elyn, Ill., and Sigurd A. Rishovd, Eau Claire, Wis., assignors to Northwestern Motor Company, Eau Claire, Wis., a corporation of Wisconsin
Filed Mar. 7, 1962, Ser. No. 178,189
7 Claims. (Cl. 56—25)

This invention relates to a chain saw and extensible mounting therefor.

Although the chain saw and vehicle mount and controlling devices described below with reference to this invention are disclosed in an assembly particularly adapted to the cutting of brush in a brush cutting operation such as would be encountered along the right-of-way of a railroad, it will be understood that the features of the invention are adaptable to chain saws and chain saw operation in a wide variety of environments.

More particularly stated, this invention relates to the mounting, lubrication, saw chain drive and chain saw guarding especially where the chain saw is of great length. Furthermore, the invention relates to a swing mount for the outrigger extension of a chain saw, not only to provide an efficient easily controlled saw in outrigger position, but also to safeguard the operation of the saw should it meet an unusual obstruction not subject to saw penetration.

An additional feature of the invention is the provision in combination with a chain saw and special lubrication therefor, of means for disseminating treatment materials to effect herbicidal reactions with respect to the surfaces and growing things over which our equipment passes in carrying out the sawing operation.

One of the most important features of the invention is the provision and association of a flywheel with the driving member for the chain of a chain saw even where the motive force comprises a substantially pulsationless motor upon the flywheel and chain drive shaft, since it is found that a chain driven at a high rate of speed and under rigorous conditions in brush cutting tends to jump out of the guiding means for the chain of the chain saw unless such a flywheel is provided, and this is especially so where the chain saw is of large dimensions.

In the drawings:

FIGURE 1 is an elevation of the folded or retracted brush cutting chain saw mounted to a railway car, the car and a portion of the rail and roadbed being shown fragmentarily and in vertical section.

FIGURE 2 is a view of the machine and apparatus of FIGURE 1, but showing the chain saw mount extended to operate over an inclined portion of the right-of-way, a foreshortened and adjusted view of the chain saw with its mount in a slightly different position being shown in dotted lines.

FIGURE 3 is a plan view of the apparatus shown in FIGURE 2, but omitting the rail car.

FIGURE 4 is a plan view of the chain saw and its immediate motor drive and adjustable mount parts.

FIGURE 5 is an elevation showing that portion of the chain saw and reciprocative mounting parts adjacent the power end of the saw.

FIGURE 6 is a foreshortened plan view of the chain saw bar and the sprocket and pulley at the ends thereof, showing the relationship of the respective ends of the bar as juxtaposed to said sprocket and pulley.

FIGURE 7 is an elevation of the outer end of the chain saw bar and the mounting clevis for the pulley, portions of the clevis and bearing for the pulley being shown in section.

FIGURE 8 is a section on line 8—8 of FIGURE 5.

FIGURE 9 is a section on line 9—9 of FIGURE 5.

FIGURE 10 is a section on line 10—10 of FIGURE 4.

FIGURE 11 is a diagrammatic arrangement of the fluid connections for the operation of the various fluid pressure motors, lubrication, oil distribution and distribution of treatment materials such as herbicide.

As indicated above, the invention is shown in an environment where, as shown in FIGURE 2, a roadbed 15 and adjacent embankment 16 of railroad right-of-way with its usual railroad tie 17 and rail 18 provide a railway upon which a vehicle 20 may progress. Merely sufficient structure of the vehicle is shown to indicate a flat bed 21 supported upon an axle 22 equipped with the usual flanged wheel 23 and to show the vertical post 24 rigidly supported by the flat bed of the vehicle upon which the chain saw mount is carried and adjustably supported. The purpose of the apparatus shown principally in FIGURES 1, 2 and 3 is the support, manipulation and operation of the large chain saw 25, shown in FIGURE 2 in its outrigger position, and in FIGURE 1 in its retracted position; but supported in all positions by a pantographic, extensible carrier 26.

Encompassing post 24 with a large tubular bearing 27 is a pantograph base 28 swingable about the post 24 and provided with vertically spaced base shafts 29 and 30, respectively for lower and upper pantograph parallel arms 31 and 32 of which there may be a sufficient number of each and of sufficient size and strength to support the outrigger members and saw in their extended positions. These parallel arms 31 and 32 extend to a pantograph articulation elbow assembly 35 provided with spaced plates 36. These plates carry not only the shafts 37 and 38 for the lower arms 31 and upper arms 32 at their points of connection to the plates 36, but also provide shaft 39 so designed that parallel outrigger arms 40 (lower) and 41 (upper) may be articulately swingably connected to chain saw carrier assembly 42. This chain saw carrier assembly has plates 43 somewhat comparable to plates 36 to provide mounting means for shafts 44 and 45 to which the parallel arms 40 and 41 are swingably connected. Also, plates 43 carry shaft 46 upon which reciprocator mounting plates 47 and 48 are pivotally mounted, and it is upon these plates 47 and 48 that there is provided a reciprocator plate 49 to be engaged by a set of ways 50 forming a part of the chain saw assembly described below for carriage of the chain saw 25 in such manner that the saw bar and chain may be readily reciprocated parallel to its longitudinal axis.

Extending between shaft 29 and shaft 38 diagonally across the parallelogram arrangement of lower arms 31 and upper arms 32 and pivotally related to each of said shafts is a hydraulic ram assembly 51 with appropriate hydraulic connection shown diagrammatically at 52. Somewhat similarly, there is provided between shaft 37 and shaft 45 diagonally across the parallel arrangement of lower arms 40 and upper arms 41, a hydraulic ram assembly 55 provided with suitable hydraulic connection at 57 for the control thereof, and it will be noted that there is a linkage arrangement 60 to carry a shaft 61 so that a hydraulic ram 62 may extend between shaft 61 and a pivotal connection with the reciprocator mounting plates 47 and 48 at 63. This hydraulic ram 62 has suitable hydraulic connection at 65 for the control thereof, thus completing a pantograph arrangement under hydraulic control for extending the chain saw 25 from the position shown in FIGURE 1 to an outrigger position such as that shown in FIGURE 2. In any one of the intermediate positions, the saw may be given an angular position such as that indicated between the dotted line position in FIGURE 2 and that shown in full lines in FIGURE 1 as will readily be understood. Each of the pantograph operations is gravity operated in one direction.

A pantograph base swing control device is shown most clearly in FIGURE 3 where it will be seen that a pantograph swing arm 67 rigidly secured to base 28 may be actuated to swing the entire pantograph assembly rotatable about the vertical axis of shaft 24. For this purpose, there is provided a hydraulic ram assembly 68 based at 69 upon a connection with the car bed 21 with appropriate hydraulic connections at 70 and 71 for the control of such swinging motion. Also, a relief valve and suitable connections at 72 provide for safety release of excessive pressure when the saw or the pantograph mechanism strikes an obstruction.

Thus as the vehicle 20 progresses along the railway right-of-way 15–16 and the contours of the right-of-way such as those shown at 16 are encountered, the extension of the pantograph from the position shown in FIGURE 1 to that shown in full lines in FIGURE 2 will dispose chain saw 25 in a desired relation to the right-of-way; and as will be described below, the various saw operation problems which may exist with respect to any portion of the path of progress of the saw may be taken care of by the operator through his controls of his hydraulic means and the various saw means now to be described.

Chain saw assembly 25 for chain saw operation under circumstances where the saw must operate "in the rough" and in an outrigger position referred to above, must be of a construction quite different from that customarily acceptable where the saw assembly is smaller, shorter, less rugged and designed to encounter less rigorous cutting conditions. Starting basically with a saw bar 75, the bar which is found most acceptable for brush cutting and right-of-way clearing is a seven foot bar as to length and ten inches in width at its widest mid-portion. It is provided with a chain groove 76 which is 7/16 inch deep in which the guide wings of the respective links of chain 77 are guided. These guide wings are of such dimensions as to extend almost to the bottom of the groove. The particular chain 77 suitable for this type of work is a three-quarter inch pitch chain and despite the fact that this chain is exceedingly rugged and is stretched about its driving and guide sprocket and about its pulley, respectively, there is a tendency for the chain to jump out of the groove 76 under ordinary operating conditions unless special provisions are made, structurally, to obviate this difficulty. Initially, too, attention is called to the fact that whereas the normal operating speed for a three-quarter inch chain would be expected to be 1200 feet per minute to accomplish normal saw operation, it is necessary to speed up the chain of the saw at least to 3,000 feet per minute and preferably 4,000 feet which marks a most important departure from previous practices in the chain saw art. In keeping with this markedly higher speed of operation, operation in rough cutting conditions, and operation at a distance from the operator, features of construction different from ordinary practices have been found necessary.

Saw bar 75 is equipped at its power drive end with a chain drive sprocket 80 aligned with the groove 76 and mounted upon output power shaft 81 of a hydraulic motor 82. This motor is secured to motor plate 83, and since this plate is wider than reciprocator plate 49, the set of ways 50 is secured to this plate 83 shown in FIGURE 8. Reciprocator mount plate 49 has a generally oblong opening so that the motor 82 extends upwardly through such opening, and provision is made for the reciprocation of the motor relative to plate 49.

Below the motor 82 and plate 83 there is sufficient shaft length for a flywheel 85 fixed on the shaft 81 intermediate sprocket 80 and the motor.

Out along the bar 75 in spaced relation to the inboard end of said bar are spacer members 86 which, with boss 87 forming part of motor plate 83, provide means for securing the saw bar to motor plate 83 through the use of cap screws 88; and since boss 87 has an outwardly extending reciprocator frame 89 parallel to what may be termed the backbone of the saw bar 75, means are provided by a bolt and slot connection at 90 for adjustment of the saw bar respecting sprocket 80 when the cap screws 88 are loosened. Chain tightening is thus facilitated.

Also, it will be noted as indicated in FIGURES 5 and 9 that a reciprocator motor 91 comprising a hydraulic ram construction with appropriate hydraulic connections at 92 and 93 is interconnected between an upper extension 94 of reciprocator frame 89 and an upper extension at 95 of a reciprocator mount plate extending laterally between plates 47 and 48, thus making it possible for the operator, under hydraulic operation of motor 91, to cause the bar 75 and its associated chain driving parts to reciprocate in and out upon the ways 50.

At the outer end of bar 75 is a two part clevis made up of two offset members 100 and 101 clamped on their respective faces of the saw bar as shown in FIGURE 7 by bolts 102 and thus providing for an idler pulley shaft 103 and an appropriate bearing mounting means for idler pulley 105 grooved at 106 for the saw chain 77. It will be noted that the end of bar 75 is shaped complementarily to idler pulley 105 with blunt nose configuration at 107 so that the groove 76 of saw bar 75 merges cleanly with idler pulley 105 to prevent the gathering of chips and debris at this crucial point in the continuity of the chain groove.

Reference has been made to the fact that saw bar 75 has a backbone. This is shown at 108 and comprises an angle member secured at frequent intervals to the saw bar by means of cap screws 109, not only to provide a stiffener for the long saw bar, but also to provide guard means for the chain and chain groove lubrication provided by multiple oil feeder pipes 110 served with lubricating oil from a main oil supply and pressure line 111 described below. It will be noted that the forward or working edge of the saw bar is along the edge indicated at 115 and that the chain moves in the direction indicated by the arrow in FIGURE 4. This means that the backbone 108 is in protective relation to the lubricant supply line 111 as to any cut members or debris resulting from the operations of the saw.

At spaced points along the forward margin of the saw bar are stop guards 116 and 116' secured to the saw bar by cap screws 117. The guards 116 are secured to the top surface of the bar and the other guards 116' are secured to the bottom surface. It will be noted that the stop guards are so shaped with an abrupt curve in the guards at 118 (see FIG. 10) as to provide no pocket for collection of sawdust or debris between the guards and the path of travel of the chain. These guards prevent stalks, twigs and flexible shrubbery from resiliently evading the sawing action of the saw chain. Stop guards are spaced apart sufficiently (on eight inch centers) to prevent the escape of any material which the saw is expected to cut.

In preparing for the operation of the above described equipment, the chain 77 is placed about sprocket 80, about idler pulley 105 and along the groove 76 of saw bar 75 whereupon the chain is tightly adjusted by means of screws 120 extending through tightener blocks 121 and against spacer members 86. Then cap screws or bolts 88 are tightened in readiness for chain operation. The tightening of these bolts and screws 88 has provided a completely stiffened outstanding relationship of the bar 75 respecting the ways 50, and the reciprocator mount plate 49 snugly fitted in the ways and connected to pantograph mounting determines that the operator can place the saw bar in any outrigger position. For instance, if the surface to be transversed by the saw blade is substantially horizontal, the operator, through the controlled feeding of liquid under pressure to the connections at 52, 57 and 65 will place the saw bar as shown in dotted lines in FIGURE 2. If the material to be cut by the saw is of such characteristics as to call for reciprocation of the complete saw bar under control of hydraulic assembly 91, the operator will then operate a valve for alternate extension and reversal of the hydraulic mechanism at 91 to continuously provide endwise reciprocation of the saw bar and its motor-chain drive since it has been found that such constant reciprocation tends to clear the saw bar of any trailing debris and also tends to place cuttable material encountering the saw chain between the guards 116.

The motor 82 comprising a hydraulic high speed motor furnished with high pressure liquid through hydraulic connections 820 and 821 will provide a substantially pulsationless rotation of sprocket 80 for the chain 75. Mention has been made of the fact that this chain is not operated at the ordinary chain speeds of 1200 to 1500 feet of chain travel per minute, but is operated at 3,000 to 4,000 feet or even greater speed. Actually the groove 76 is 7/16 inch deep, and the guides for the links extend almost to full depth of the groove. These unusually high speeds and the greater length of the chain saw as described above have been found to present phenomenal problems, in that despite the adjustment of the chain to a degree of tightness upon its sprocket and pulley greater than usual in chain saw practice, it will actually jump out of the groove and cause destructive operation of the saw unless flywheel 85 on the sprocket shaft 81 is provided. The flywheel, demonstrated repeatedly in test operations, is effective if an approximately forty-five pound flywheel is provided, and the tests have shown that a completely inoperative chain saw of the chain characteristics shown in the drawing, but omitting the flywheel 85 can be made into a perfectly reliable chain saw for all chain saw purposes including the most rugged right-of-way clearance if the flywheel is provided. This result is surprising because the motor 82 is inherently substantially pulsationless and the chain is as tight around its pulley and sprocket as can be expected to be practical in operation. Some marked assistance is also noticeable if a full complement of sprocket teeth is provided in sprocket 80.

While not shown in detail, there are hydraulic connections and valves for control of the various hydraulic ram type "motors" referred to above. The control system involves off and on valves to extend or retract the respective rams by means of liquid under pressure supplied from a source comprising a pump and reservoir. Special note is made, however, of the hydraulic ram assembly 68 which, as shown in FIGURE 3, is provided with a by-pass at 72 with an automatic valve at 73. This automatic valve is so spring loaded as to permit the entire pantograph assembly to rotate in either direction if the pressure for a given directional movement exceeds a predetermined value. Thus, if the saw or any portion of the pantograph assembly encounters an obstruction which might be destructive of the equipment in the event that the car 20 continues to move, then the equipment may rotate about the shaft 24, and the attention of the operator will be attracted so as to cause him to stop his vehicle or remove the obstruction.

FIGURE 11 shows diagrammatically the various fluid pressure elements and the connecting pressure and relief tubes for the operation of the entire apparatus, and in connection therewith it will be seen that there is a prime mover 120' driving a main pump 121' for supply of fluid 122 from sump 123 through conduit 124 on the low pressure side of the system into high pressure conduit 125. High pressure fluid from the conduit 125 is fed to hydraulic ram assembly 51 through connection 52; to hydraulic ram assembly 55 through connection 57; and to ram assembly 62 through connection 65. Thus through a pantograph extension valve 126 or 127 and through a tilt valve 128 the saw blade may be positioned at any angle or extent of movement lateral of the vehicle 20 as desired by the operator; it being understood that when the particular valve operated by the operator is moved to its "off" position, the high pressure fluid is relieved through exhaust line 130, and the fluid is returned to the sump 123.

Through valve 131, the operator may control hydraulic ram assembly 68 which is a double-acting assembly with an overload release described above.

High pressure fluid from conduit 125 is supplied to the saw motor 82 for the high speed operation of the saw as indicated above, and it is on the shaft 81 of the hydraulic motor 82 that the flywheel 85 is provided.

Then, too, since the vehicle 20 is operated by means of a hydraulic motor, there is a hydraulic motor at 135 connected, by means not shown, to the axle 22 and wheels 23 of the vehicle 20.

Description has already been provided for the lubrication connections through connection 110 at spaced points along the groove 76 of the saw bar 75. These connections 110 are shown in FIGURE 11, but as disclosed in FIGURE 11, it will be noted that the motor 135 drives a special pump 136 which is supplied not only with lubricating oil as shown, but is provided with connections to a reservoir 137 which supplies fluid treatment material or herbicide to the same supply line 138 which supplies pump 136 with lubricating oil.

In this connection, it has been noted that the high speed movement of the chain 77 in the particular groove requires a considerable supply of lubricating oil and that this lubricating oil is disseminated in an oily "fog" trailing from the saw assembly. It is possible to supply fluid treatment material or herbicide to an oil supply line 138 which serves to feed the lubrication to the pump 136 and thus accomplish a sawing operation, but also a service and vegetation treatment over the area serviced by the equipment. Suitable valves as shown for control of the lubricating oil and for the fluid treatment reservoir 137 are provided.

We claim:

1. A cutter for cutting brush along a road right-of-way and comprising a vehicle movable along the road, plural pantographs movably joined end to end and forming a frame mounted at one end on board the vehicle for horizontal rotation and for lateral extension and retraction of the other frame end outboard of the vehicle, each pantograph including upper and lower arms pivoted in spaced relation for substantially parallel movement of the arms relative to one another as the frame is extended and retracted, motor means acting between the pivot of a lower arm at one end and the pivot of an upper arm at the other end of each pantograph for vertical movement of each of the pantographs for extension and retraction of the outboard frame end, motor means on the vehicle for rotating the frame horizontally, a chain saw, a saw carrier assembly pivotally supported on the outboard end of the frame for movably mounting the saw on and positioning the saw at an angle relative to the frame, motor means connecting the frame with the saw carrier assembly for varying the angle between the frame and the saw, motor means mounted on the saw carrier assembly for driving the saw chain, and means for individually controlling operation of the several motor means for simultaneously placing the saw in cutting position along the road at voluntarily variable angles to the road centerline in horizontal and vertical directions and for driving the saw chain.

2. The brush cutter of claim 1 in which the motor means for horizontal rotation of the frame is provided with means releasing the motor means for free rotation of the frame upon obstruction to movement of the saw along the road in brush cutting position.

3. The brush cutter of claim 1 in which a source of fluid pressure at up to a given value is mounted on the vehicle and the motor means for horizontally rotating the frame is operated by fluid pressure from said source and the means releasing the motor means is a valve opening for discharge of fluid pressure from the motor upon increase in the pressure therein beyond said given value.

4. The brush cutter of claim 1 in which the pantographs are joined by an elbow assembly having a triangular portion and the saw carrier includes a triangular portion, the upper and lower arms of each pantograph being connected to different apices of said triangular portions for securing of the upper and lower arms of each pantograph in substantially parallel relation from maximum spacing to minimum spacing of the arms from one another.

5. The brush cutter of claim 1 in which the saw carrier assembly includes a reciprocator mount for reciprocable sliding therein of an end portion of the chain saw bar and motor means connecting the saw and the reciprocator mount for reciprocating the saw, the reciprocator mount being pivoted to the outboard end of the frame and the angle varying motor means of such assembly being pivoted at the ends respectively on the frame and on the reciprocator mount for tilting thereof and tilting of the saw vertically at an angle relative to the frame.

6. The brush cutter of claim 1 in which the saw carrier assembly includes a reciprocator mount pivoted to the outboard end of the frame and motor means connecting the saw with the reciprocator mount for reciprocating the saw as a whole and a linkage mounted on spaced pivots of the outboard end of the frame, the angle varying motor means of such assembly being pivoted at the ends respectively on the frame and to an intermediate pivot on the linkage for tilting thereof and tilting of the saw relative to the frame.

7. The brush cutter of claim 1 in which a plate is adjustably attached to the saw bar for supporting the saw and its drive and the saw carrier assembly includes a reciprocator mount pivoted to the outboard end of the frame for sliding therein of the plate supporting the chain saw bar, the motor means for reciprocating the saw being mounted on the reciprocator mount and adjustably attached to the saw bar, motor means mounted on the plate to drive the saw chain, and a flywheel is driven by the motor means to keep the chain moving at substantially uniform speed in the saw bar grooves as the plate slides in the reciprocator mount.

References Cited by the Examiner
UNITED STATES PATENTS

| | | | |
|---|---|---|---|
| 710,838 | 10/1902 | Brines | 143—32.34 |
| 919,039 | 4/1909 | Leoni | 56—25 |
| 1,123,783 | 1/1915 | Muir | 143—32.34 |
| 1,264,441 | 4/1918 | Rue | 47—1 |
| 1,353,891 | 9/1920 | Cook | 56—291 |
| 1,911,516 | 5/1933 | Landing | 56—25 |
| 2,351,740 | 6/1944 | Blum | 143—32 |
| 2,588,002 | 3/1952 | Holmes | 56—25 |
| 2,588,004 | 3/1952 | Holmes | 56—25 |
| 2,603,249 | 7/1952 | Lawrence | 143—43.34 |
| 2,642,901 | 6/1953 | Hayden | 30—167 |
| 2,698,034 | 12/1954 | Jakku | 30—167 |
| 2,746,492 | 5/1956 | De Hardit | 143—32.34 |
| 2,815,048 | 12/1957 | Davis | 143—32.34 |
| 2,832,183 | 4/1958 | Pittman | 56—25 |
| 2,845,967 | 8/1958 | Hutchinson | 143—32.10 |
| 2,962,061 | 11/1960 | Nielsen | 143—32.1 |
| 2,992,660 | 7/1961 | Merz | 143—32.1 |

FOREIGN PATENTS 472,063  3/1951  Canada.

ABRAHAM G. STONE, *Primary Examiner.*

DONALD R. SCHRAN, T. GRAHAM CRAVER,
*Examiners.*